US012683178B2

(12) United States Patent
Hong et al.

(10) Patent No.: US 12,683,178 B2
(45) Date of Patent: Jul. 14, 2026

(54) SEPARATOR FOR FUEL CELL WITH EXCELLENT CORROSION RESISTANCE AND CONDUCTIVITY AND COATING METHOD THEREFOR

(71) Applicants: Hyundai Motor Company, Seoul (KR); Kia Corporation, Seoul (KR)

(72) Inventors: Woong Pyo Hong, Suwon (KR); Jung Yeon Park, Hwaseong (KR); Seung Jeong Oh, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 683 days.

(21) Appl. No.: 18/078,935

(22) Filed: Dec. 10, 2022

(65) Prior Publication Data

US 2023/0369623 A1      Nov. 16, 2023

(30) Foreign Application Priority Data

May 11, 2022      (KR) ........................ 10-2022-0057800

(51) Int. Cl.
*H01M 8/1004*      (2016.01)
*H01M 8/0234*      (2016.01)

(52) U.S. Cl.
CPC ....... *H01M 8/1004* (2013.01); *H01M 8/0234* (2013.01)

(58) Field of Classification Search
CPC ............. H01M 8/1004; H01M 8/0206; H01M 8/0213; H01M 8/0228; H01M 8/0204; H01M 8/0208; H01M 8/021; H01M 8/0234; H01M 8/0245
See application file for complete search history.

(56) References Cited

U.S. PATENT DOCUMENTS

| | | | |
|---|---|---|---|
| 9,276,272 B2 | 3/2016 | Lee et al. | |
| 2011/0287336 A1* | 11/2011 | Himeno | H01M 8/0228 |
| | | | 429/492 |
| 2013/0251998 A1* | 9/2013 | Hwang | B82Y 40/00 |
| | | | 148/516 |
| 2014/0302416 A1* | 10/2014 | Lee | H01M 8/0245 |
| | | | 429/468 |

FOREIGN PATENT DOCUMENTS

| | | | |
|---|---|---|---|
| JP | 2017-220362 A | 12/2017 | |
| JP | 2020-177781 A | 10/2020 | |
| KR | 10-2014-0094736 A | 7/2014 | |
| KR | 10-1826574 B1 | 3/2018 | |
| KR | 10-2018-0067310 A | 6/2018 | |
| KR | 10-2018-0069560 A | 6/2018 | |

OTHER PUBLICATIONS

Asset, T. et al, "Activity and Durability of Platinum-Based Electrocatalysts Supported on Bare or Fluorinated Nanostructured Carbon Substrates", Journal of The Electrochemical Society, 165 (6) F3346-F3358 (2018).

* cited by examiner

*Primary Examiner* — Dah-Wei D. Yuan
*Assistant Examiner* — Pin Jan Wang
(74) *Attorney, Agent, or Firm* — Fox Rothschild LLP

(57) ABSTRACT

Disclosed are a separator for a fuel cell having excellent corrosion resistance and conductivity and a method of manufacturing the same. The separator includes a metal base material and a carbon coating layer formed on the surface of the metal base material, and the carbon coating layer includes carbon domains having a size in the range of about 15 to 30 nm.

6 Claims, 11 Drawing Sheets

SEPARATOR FOR FUEL CELL WITH EXCELLENT CORROSION RESISTANCE AND CONDUCTIVITY AND COATING METHOD THEREFOR

The present application claims priority to Korean Patent Application No. 10-2022-0057800, filed May 11, 2022, the entire contents of which is incorporated herein for all purposes by this reference.

TECHNICAL FIELD

The present disclosure relates to a separator for a fuel cell. The separator may have with excellent corrosion resistance and conductivity by including a carbon coating layer and a metal oxide film.

BACKGROUND

A fuel cell stack may be divided into repeatedly stacked parts such as an electrode membrane, a separator, a gas diffusion layer, and a gasket, and non-repeatedly stacked parts such as a stack module fastening member, an enclosure for protecting the stack, an interfacing member for interfacing between a fuel cell and a vehicle, a high voltage connector, and the like.

The fuel cell stack is a device that generates electricity, water, and heat by reaction between hydrogen and oxygen contained in air. The fuel cell stack has many risk factors because high-voltage electricity, water, and hydrogen coexist in the same place.

In particular, for a separator, corrosion resistance is highly required due to the direct contact with hydrogen cations generated during a fuel cell operation. When a metal separator is used directly without being surface treated, the metal in the metal separator is likely to corrode, and an oxide generated on the surface of the metal acts as an electrical insulator, which reduces electrical conductivity. In this case, the dissociated and eluted metal cations contaminate the membrane electrode assembly (MEA), resulting in deterioration in the performance of the fuel cell.

For this reason, the separator, which is a key component of the fuel cell stack, is required to cause a low corrosion current and to have good electrical conductivity. The exiting metal separators have a problem in that they are not durable because they are easily corroded.

Therefore, under the background described above, research on metal separators with a coating layer which improves not only corrosion resistance but also conductivity has been actively conducted.

SUMMARY

In preferred aspects, provided are a separator for fuel cell with excellent corrosion resistance and conductivity and a coating method for the separator.

The objective of the present disclosure is not limited to the objective mentioned above. The objectives of the present disclosure will become more apparent from the following description and will be realized by means and combinations thereof described in the claims.

In an aspect, provided is a separator including a metal base material and a carbon coating layer formed on the surface of the metal base material. The carbon coating layer include a carbon domain having a size in the range of about 15 to 30 nm.

The term "carbon domain" as used herein refers to a region of the carbon coating layer that is formed of cluster or crystal form of carbon material such as graphene, graphite, or fullerenes. The carbon domain may preferably have two-dimensional crystal carbon material (e.g., graphene).

The thickness of the carbon coating layer may be in the range of about 50 nm or less.

The separator may be positioned between the metal base material and the carbon coating layer and may further include a metal oxide film formed on a surface of the metal base material.

The thickness of the carbon coating layer may be in the range of about 30 nm or less.

The thickness of the metal oxide film may be about 5% to 10% of the thickness of the carbon coating layer.

The metal oxide film may have a ratio of a peak area represented by Formula 1 in the range of about 704 to 713 eV of about 0.1 to 0.2 during X-ray photoelectron spectroscopy (XPS) analysis.

$$A_{Fe-O}/(A_{Fe-O}+A_{Fe}) \qquad \text{[Formula 1]}$$

In Formula 1, $A_{Fe-O}$ is the area of the XPS peak representing the Fe—O binding energy, and Are is the area of the XPS peak representing the Fe binding energy.

In an aspect, provided is a method of coating the separator as described herein. The method of coating a separator for a fuel cell may include providing a metal base material; removing impurities and oxide films on the surface of the metal base material; and forming a carbon coating layer including a carbon domain having a size in the range of about 15 to 30 nm on the surface of the metal base material by injecting a carbon precursor gas and converting the gas to a plasma state.

In the forming of the carbon coating layer, the thickness of the carbon coating layer may be deposited to about 50 nm or less.

Removing the oxide film may include removing a portion of the oxide film on the surface of the metal base material.

In the forming of the carbon coating layer, the thickness of the carbon coating layer may be deposited in the range of about 30 nm or less.

The metal oxide film may have a ratio of a peak area represented by Formula 1 in the range of about 704 to 713 eV of about 0.1 to 0.2 during X-ray photoelectron spectroscopy (XPS) analysis.

$$A_{Fe-O}/(A_{Fe-O}+A_{Fe}) \qquad \text{[Formula 1]}$$

In Formula 1, $A_{Fe-O}$ is the area of the XPS peak representing the Fe—O binding energy, and Are is the area of the XPS peak representing the Fe binding energy.

Removing the oxide film may be performed by applying plasma in a gas atmosphere using at least one selected from the group consisting of Ar, He, $H_2$, $N_2$, and a combination thereof.

The removing the oxide film may be performed at a temperature of about 300° C. to 550° C. in a vacuum of about $10^{-3}$ to $10^{-1}$ Torr.

The coating method for the separator may further include cooling the metal base material, which is performed after forming the carbon coating layer.

The coating method for the separator may be performed in a vacuum chamber.

In an aspect, provided is a fuel cell including the separator as described herein.

Further provided is a vehicle including the fuel cell as described herein.

According to various exemplary embodiments of the present disclosure, the separator may have excellent electrical conductivity and improved corrosion resistance.

In addition, according to various exemplary embodiments of the present disclosure, a manufacturing method may provide the separator with improved corrosion resistance while having excellent electrical conductivity.

The effects of the present disclosure are not limited to the effects mentioned above. It should be understood that the effects of the present disclosure include all effects that can be inferred from the following description.

BRIEF DESCRIPTION OF THE DRAWINGS

FIGS. 4A and 4B are measurement results of the contact resistance and corrosion current density according to the thickness of the carbon coating layer in the separator;

DETAILED DESCRIPTION

Figure 1:
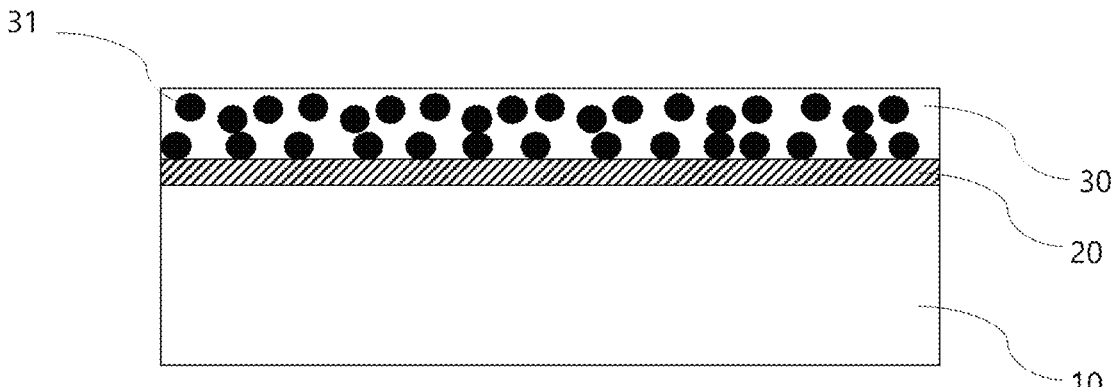
FIG. 1 shows an exemplary separator according to an exemplary embodiment of the present disclosure.

The above objectives, other objectives, features, and advantages of the present disclosure will be easily understood through the following preferred embodiments in conjunction with the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those skilled in the art.

Like reference numerals have been used for like elements in describing each figure. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In this specification, the terms "include" or "have" should be understood to designate that one or more of the described features, numbers, steps, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where another part is in the middle. Conversely, when a part of a layer, film, region, plate, etc., is said to be "under" another part, this includes not only cases where it is "directly under" another part but also a case where another part is in the middle.

Unless otherwise specified, all numbers, values, and/or expressions expressing quantities of ingredients, reaction conditions, polymer compositions, and formulations used herein contain all numbers, values, and/or expressions in which such numbers essentially occur in obtaining such values, among others. Since they are approximations reflecting various uncertainties in the measurement, it should be understood as being modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Among other things, a vehicle including a fuel cell (hereinafter referred to as a "fuel cell vehicle") requires various levels of power from the fuel cell. When a relatively high level of power is required from the fuel cell, the volume of the fuel cell mounted within the vehicle may increase. As a result, the amount of space occupied by the fuel cell in the fuel cell vehicle increases, which may cause various problems.

The present disclosure relates to a separator for a fuel cell with excellent corrosion resistance and conductivity. Hereinafter, the present disclosure will be described in more detail with reference to the accompanying drawings. FIG. 1 is a schematic diagram of a cross-section of the separator according to the present disclosure.

As shown in FIG. 1, a configuration of the separator will be described in more detail as follows.

The separator 100 includes a metal base material 10 and a carbon coating layer 30 formed on the surface of the metal base material 10 and composed of a carbon domain 31 having a size in the range of 15 to 30 nm. Particularly, the separator 100 is positioned between the metal base material 10 and the carbon coating layer 30 and may further include a metal oxide film 20 formed on the surface of the metal base material 10.

In the separator 100, the carbon coating layer 30 may have a thickness in the range of about 50 nm or less.

Figure 2A:
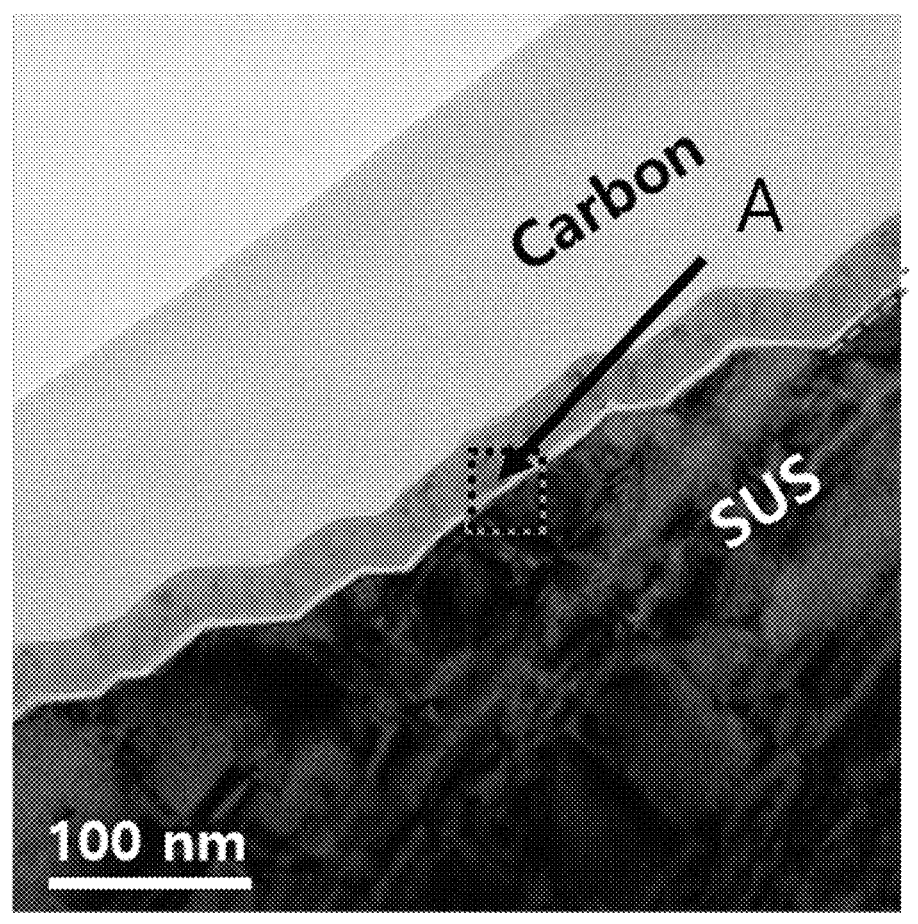
FIGS. 2A and 2B are scanning electron microscope (SEM) pictures of a cross-section of an exemplary separator according to an exemplary embodiment of the present disclosure.
Figure 2B:
Figure 2B:
Figure 2B:
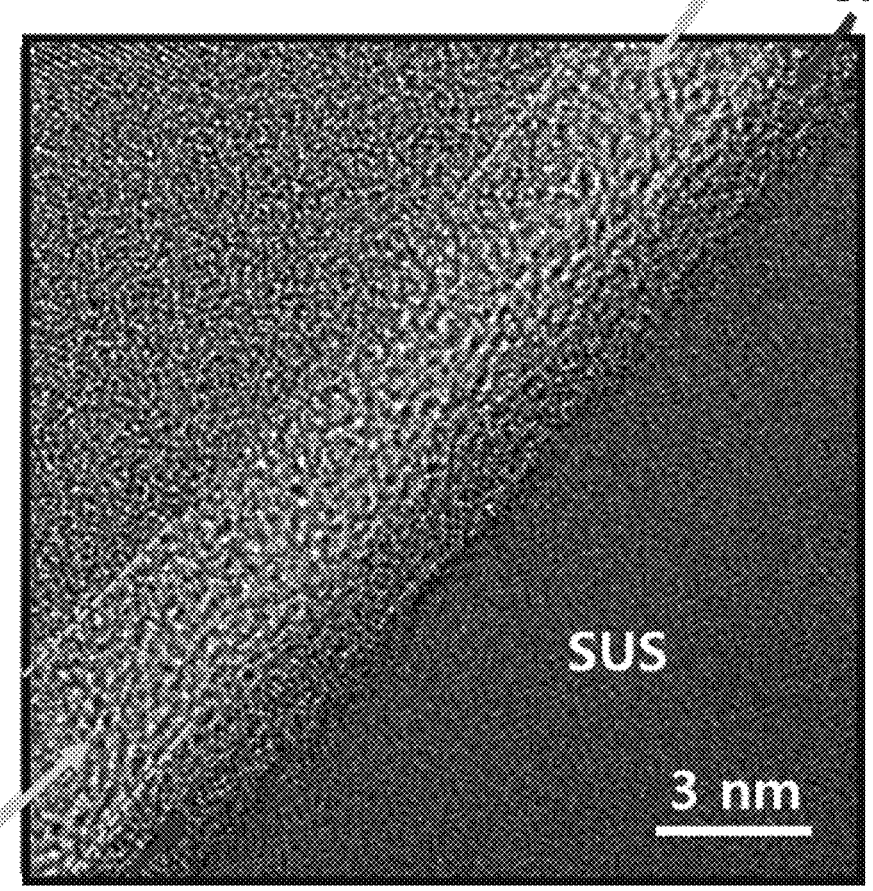

FIGS. 2A and 2B are scanning electron microscope (SEM) images of a cross-section of a separator, according to the present disclosure. As shown in FIG. 2A, in the separator 100, the carbon coating layer 30 may be formed to a predetermined thickness on the surface of the metal base material 10. In addition, FIG. 2B shows an enlarged view of region A of FIG. 2A in the separator 100, thus a metal oxide film 20 may be positioned between the metal base material 10 and the carbon coating layer 30 and formed with a predetermined thickness.

As the metal base material 10, the metal base material 10 used for the separator 100 may be used without limitation. For example, a stainless-steel plate or austenitic stainless steel 316L may be used as the metal base material.

On the other hand, since the stainless-steel sheet has poor electrical conductivity, a surface treatment technology may be being applied to overcome this, and a CVD carbon coating technology with a relatively low cost is in the spotlight.

The separator 100 includes a carbon coating layer 20 positioned on one surface of the metal base material 10. The carbon coating layer 20 may be formed by a coating method described below.

The carbon coating layer 30 may be formed of a carbon domain 31 having a size in the range of about 15 to 30 nm. By appropriately controlling the size of the carbon domain 31 particles in the carbon coating layer 30, the low contact resistance and low corrosion potential characteristics of the separator 100 can be simultaneously obtained. The larger the size of the average carbon domain 31 in the carbon layer, the better the conductivity and corrosion resistance. However, when the particle size of the carbon domain 31 is greater than the predetermined size, e.g., greater than about 30 nm, the actual contact area decreases, thereby increasing the contact resistance of the separator 100, and a large number of micropores in the carbon coating layer may occur, which leads to an increase in the corrosion current of the separator 100. Accordingly, the particle size of the carbon domains 31 in the carbon coating layer 30 may be appropriately controlled within the above-described range.

The term "carbon domain" refers to a region on the coating layer including crystal plane in carbon material (e.g., graphene), and the "size of the carbon domain" refers to the size of the region of the crystal plane.

In the separator 100, the thickness of the carbon coating layer 30 may be in the range of about 50 nm or less. When the thickness of the carbon coating layer 30 is in the range of about 50 nm or greater, residual stress due to a lattice difference with the metal base material 10 is increased so that the conductivity and corrosion resistance may be deteriorated.

In the separator 100, the thickness of the carbon coating layer 30 may be about 30 nm or less. The separator includes a metal oxide film 20 positioned between the metal base material 10 and the carbon coating layer 30 and formed on the surface of the metal base material 10.

The metal oxide film 20 is formed on the surface of the metal base material 10 so that the corrosion resistance can be supplemented. When the thickness of the carbon coating layer 30 is relatively thick, the corrosion resistance is not affected even if the metal oxide film 20 does not exist.

On the other hand, when the thickness of the carbon coating layer 30 is in the range of 30 nm or less, the metal oxide film 20 exists to some extent. The thickness of the metal oxide film 20 must be in the range of about 5% to 10% of the thickness of the carbon coating layer 30 to exhibit corrosion resistance of a certain level or more. Accordingly, in the separator 100, according to the present embodiment, the thickness of the metal oxide film 20 may be in the range of about 5% to 10% of the thickness of the carbon coating layer 30.

Therefore, when the metal oxide film 20 is formed in the separator 100, the thickness of the metal oxide film 20 exists in the range of about 5% to 10% of the thickness of the carbon coating layer 30, and the peak area ratio confirmed through XPS may be about 0.1 to 0.2.

The metal oxide film 20 may have a ratio of a peak area satisfying Formula 1 in the range of about 704 to 713 eV in X-ray photoelectron spectroscopy (XPS) analysis of about 0.1 to 0.2.

$$A_{Fe-O}/(A_{Fe-O}+A_{Fe}) \qquad \text{[Formula 1]}$$

In Formula 1, $A_{Fe-O}$ is the area of the XPS peak representing the Fe—O binding energy, and Are is the area of the XPS peak representing the Fe binding energy.

When the ratio of the metal oxide film 20 is excessively increased, the corrosion current decreases, but a problem occurs in that the contact resistance increases. When the ratio of the metal oxide film 20 is excessively decreased, e.g., greater than about 0.2, the contact resistance decreases, but a problem occurs in that the corrosion current increases.

The separator 100, has a specific structure of the carbon coating layer 30 and a specific ratio of the metal oxide film 20, thereby having excellent corrosion resistance and conductivity, thereby being usefully used in a fuel cell.

In another aspect, the present disclosure relates to a coating method for the separator with excellent corrosion resistance and conductivity. Hereinafter, the present disclosure will be described in more detail with reference to the accompanying drawings. In the coating method for a separator, a configuration of metal wood, a carbon coating layer, and an oxide film is related to the separator described above, and a detailed description of the same configuration as described above will be omitted.

Figure 3:
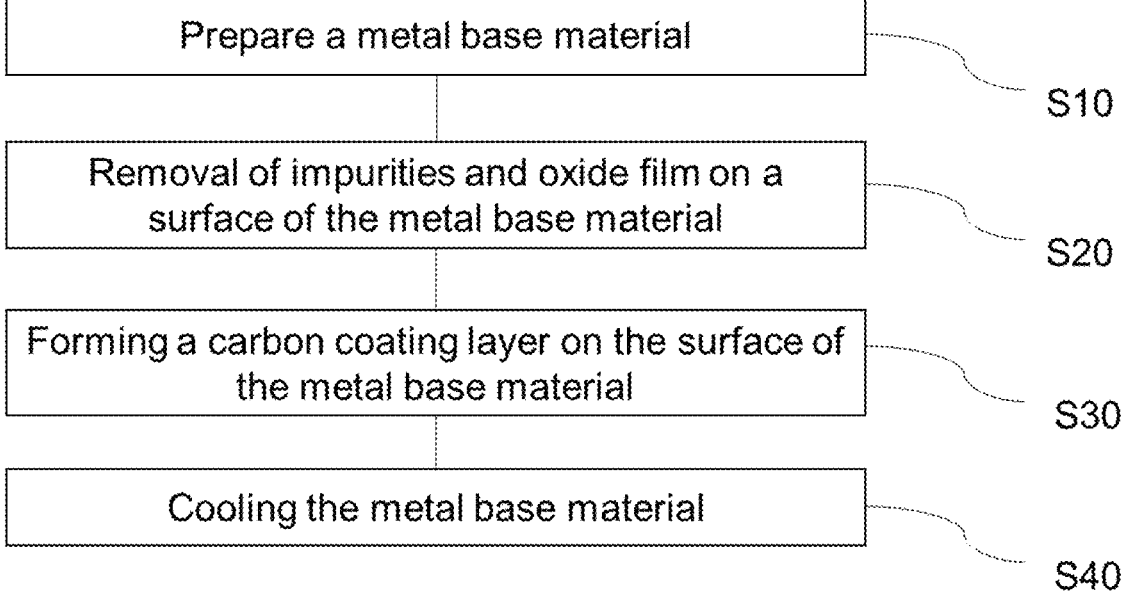
FIG. 3 shows an exemplary coating method for the separator according to an exemplary embodiment of the present disclosure.

FIG. 3 shows a flowchart showing an exemplary coating method for the separator according to the present disclosure. As shown in FIG. 3, the method for coating the separator: providing a metal base material S10; removing impurities and an oxide film on the surface of the metal base material S20; and forming a carbon coating layer composed of a carbon crystal domain having a size in the range of 15 to 30 nm on the surface of the metal base material by injecting a carbon precursor gas and converting the gas to a plasma state S30. The method for coating the separator may further include cooling the metal base material S40, which is performed after forming the carbon coating layer.

Each step of the method for coating the separator according to the present disclosure will be described in detail as follows.

In step S10, a metal base material is prepared. As the metal base material, a metal base material used in a separator for a fuel cell may be used without limitation. For example, a stainless-steel plate may be used as the metal base material.

In the thin film coating method, the coating method of the separator may be performed inside a chamber in a vacuum state.

For example, in step S10, the metal base material may be placed in a chamber in a vacuum and elevated temperature state. The chamber may be in a state in which impurities in the chamber are removed by raising the temperature from about 350° C. to 500° C. and a vacuum degree of about $10^{-6}$ Torr or less.

Prior to describing the following process, the thin film coating method may preferably use a plasma enhanced chemical vapor deposition (PECVD) method to remove an oxide film and form a carbon coating layer. The present disclosure uses a PECVD method, thereby using a metal base material and a carbon material, which are inexpensive materials, and enables a large capacity process according to a gas decomposition method. Therefore, the separator having excellent corrosion resistance and conductivity may be manufactured through a low-cost process by low-temperature coating through plasma application.

In step S20, impurities and an oxide film on the surface of the metal base material are removed before the carbon coating layer is formed.

For example, in step S20, at least one gas selected from the group consisting of Ar, He, $H_2$, $N_2$, and a combination thereof may be mixed and injected into the chamber. Thereafter, by applying plasma to the chamber at a vacuum of about $10^{-3}$ to $10^{-1}$ Torr and a temperature of about 300° C. to 550° C., impurities and an oxide film on the surface of the metal base material may be removed.

In step S20, when the thickness of the carbon coating layer to be described later is in the range of 30 nm or less, a part of the oxide film on the surface of the metal base material may be removed. In this case, the metal oxide film may be formed by about 0.1% to 0.2% of the carbon coating layer.

In step S30, a carbon coating layer is deposited on the surface of the metal base material.

For example, in step S30, in addition to Ar and $H_2$ gas, hydrocarbon-based carbon precursor gas may be additionally injected to form a gas atmosphere. Thereafter, a plasma is operated in the chamber under a constant process pressure into which the carbon precursor gas is injected to form a carbon coating layer by the carbon precursor on the surface of the metal base material.

In step S30, the thickness of the carbon coating layer may be deposited in the range of about 50 nm or less. When the thickness of the carbon coating layer is in the range of about 50 nm or greater, residual stress due to a lattice difference with the metal base material may be increased, thereby causing a problem in that conductivity and corrosion resistance have deteriorated. The carbon coating layer may be formed of a carbon domain having a size in the range of about 15 to 30 nm.

In step S40, in order to prevent deformation of the coating layer and the base material, the metal base material is cooled by lowering the chamber temperature.

For example, in step S40, a small amount of nitrogen gas may be continuously injected into the chamber to cool the chamber temperature to about 100° C. or less. When the chamber temperature is in the range of about 100° C. or less, the chamber is opened to finally recover the separator on which the carbon coating layer is formed.

EXAMPLE

Hereinafter, the present disclosure will be described in more detail with reference to a specific example. The following examples are merely illustrative to help the understanding of the present disclosure, and the scope of the present disclosure is not limited thereto.

Example

As follows, a separator was prepared by using plasma-enhanced chemical vapor deposition of SUS 316L, which is an austenite-based stainless steel, as a metal base material.

In the argon and $H_2$ gas atmosphere of the chamber in which the internal pressure was controlled to $10^{-3}$ to $10^{-1}$ Torr and the internal temperature was heated to 350° C. to 500° C., plasma was applied to the metal base material to partially remove the oxide film formed on the surface of the metal base material. Thereafter, a hydrocarbon-based carbon precursor was additionally injected into the chamber in addition to the existing Ar and $H_2$ gases, thereby forming the above gas atmosphere and constant process pressure. Then, the carbon coating layer plasma was formed by applying plasma, which plasma allows to decompose of the carbon precursor.

Then, the separator was recovered by opening the chamber when the temperature inside the chamber reached 100° C. or less by maintaining a vacuum state formed on the surface of the base material or injecting a trace amount of nitrogen gas into the chamber. At this time, the thickness of the carbon coating layer of the prepared separator was in the range of 15 to 30 nm.

Experimental Example 1 (Thickness of Carbon Coating Layer)

Figure 4A:
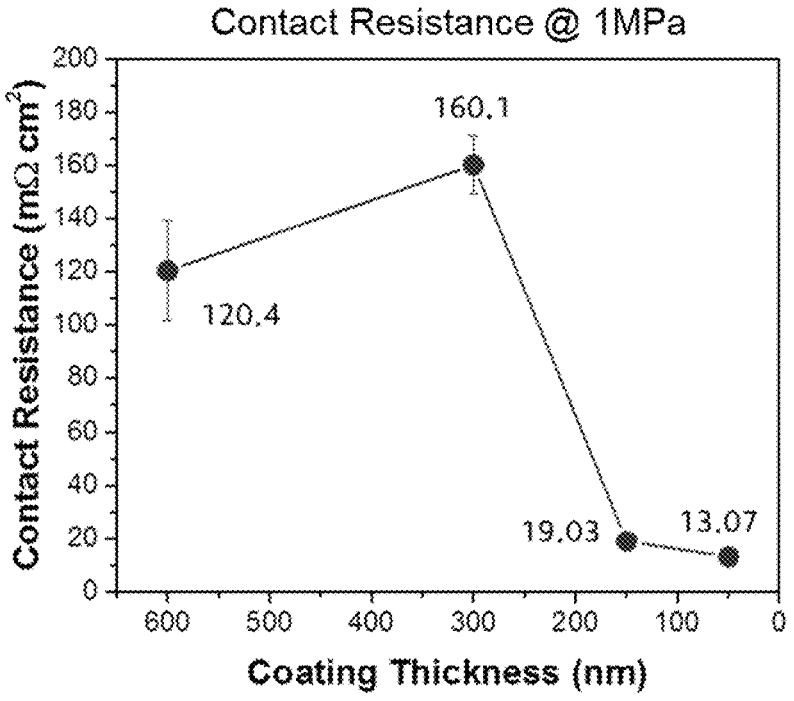
Figure 4B:
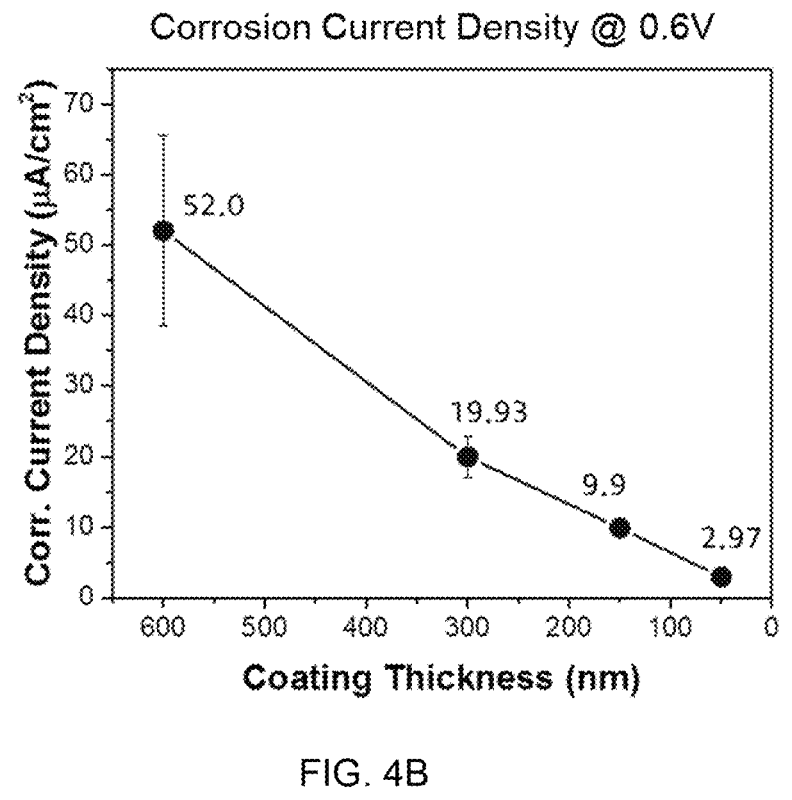

In order to confirm the optimized thickness of the carbon coating layer of the separator prepared by the preparing method according to the present disclosure, the contact resistance, and corrosion current density according to the thickness of the carbon coating layer were checked. FIG. 4A shows the contact resistance according to the thickness of the carbon coating layer in the separator. FIG. 4B shows the corrosion current density according to the thickness of the carbon coating layer in the separator.

As shown by the results of FIGS. 4A and 4B, when the thickness of the carbon coating layer was increased greater than a certain range of the thickness, the residual stress due to the lattice difference with the metal base material increased, thereby degrading the conductivity and corrosion resistance. Therefore, the thickness of the carbon coating layer in the separator was in the range of 50 nm or less.

Experimental Example 2 (Carbon Domain Particle Size)

In order to confirm the optimized carbon domain particle size of the separator prepared by the preparing method, the intensity of the D/G band was calculated through Formula 1 below using Raman spectroscopy and the results are shown in Table 1.

$$^i L_a(\text{nm}) = \left(2.4 \times 10^{-10}\right) \lambda_l^4 \left(\frac{I_D}{I_G}\right)^{-1}$$ [Formula 1]

TABLE 1

|  | $I_D$ | $I_G$ | Domain size |
|---|---|---|---|
| (A) | 1044 | 1124 | 20.69 nm |
| (B) | 301 | 336 | 21.46 nm |

Figure 5:
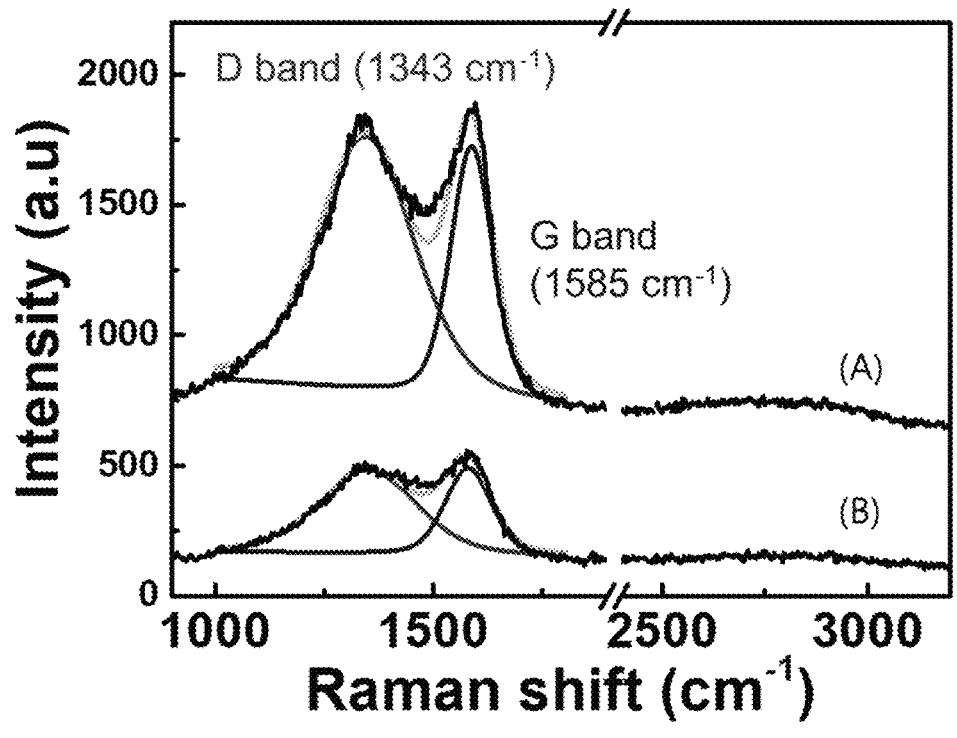
FIG. 5 is a Raman spectroscopy analysis result for confirming the intensity of the D/G band in the separator according to the present disclosure.

FIG. 5 is a Raman spectroscopy analysis result for confirming the intensity of the D/G band in an exemplary separator according to an exemplary embodiment of the present disclosure. (Here, the red line is the D band intensity, and the blue line is the G band intensity.)

As shown in FIG. 5 and Table 1, the preferred carbon domain particle size is about 20 nm.

Figure 6A:
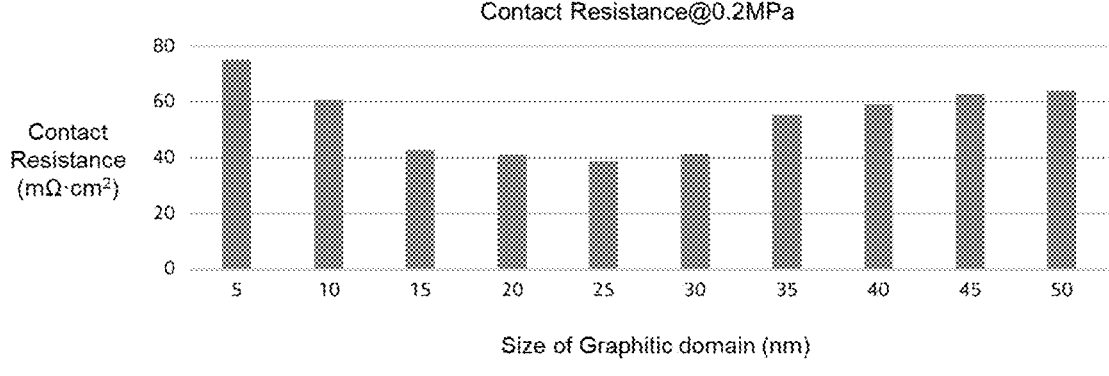
FIGS. 6A and 6B are measurement results of the contact resistance and corrosion current density according to the carbon domain particle size in the separator.
Figure 6B:
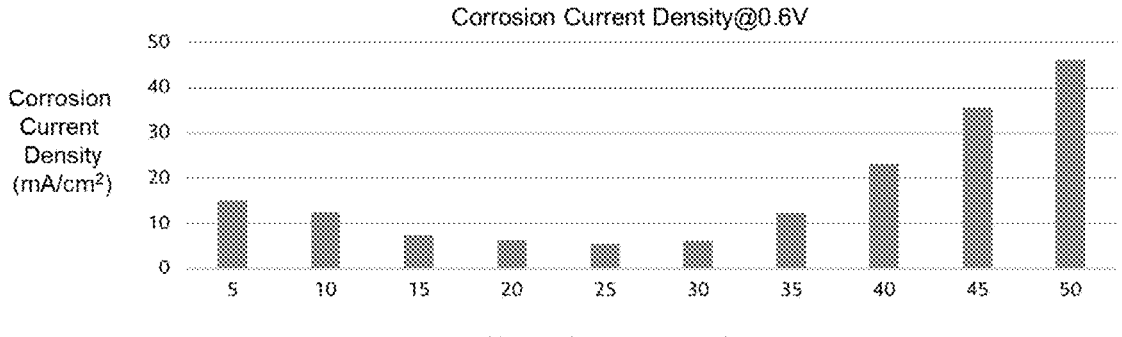

Subsequently, the contact resistance and corrosion current density according to the optimized carbon domain particle size were confirmed. FIG. 6A shows the contact resistance according to carbon domain particle size in a separator. FIG. 6B shows the corrosion current density according to the carbon domain particle size in the separator. The thickness of the carbon coating layer of the separator prepared here was 20 nm.

As shown by the results of FIGS. 6A and 6B, in the separator specimen, the contact resistance was about 50 $m\Omega cm^2@0.2$ MPa or less, and the corrosion current was measured to be 10 $\mu A/cm^2@0.6$ V or less. Therefore, in the present disclosure, by appropriately controlling the size of the carbon domain particles in the carbon coating layer, low contact resistance and low corrosion potential characteristics of the separator can be obtained at the same time. Therefore, the range of the size of the carbon domain particles in the separator was about 15 to 30 nm.

Experimental Example 3 (Carbon Coating Laver/Metal Oxide Ratio)

In order to confirm the optimized carbon coating layer/metal oxide film ratio of the separator prepared by the preparing method, the area of the Fe, Fe—O bonding peak of the Fe spectrum was calculated using X-ray photoelectron spectroscopy (XPS). The thickness of the carbon coating layer of the separator prepared here was in the range of 30 nm or less.

Figure 7A:
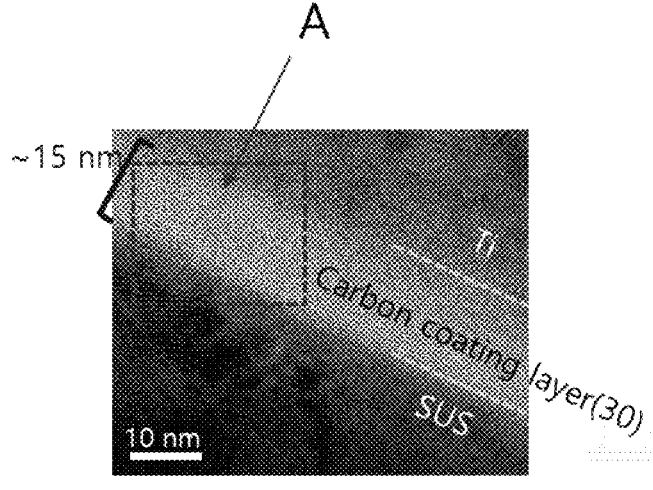
FIGS. 7A and 7B are scanning electron microscope (SEM) pictures of a cross-section of the separator according to the present disclosure.

As shown in FIG. 7A, the thickness of the carbon coating layer of the separator was about 15 nm.

Figure 7B:
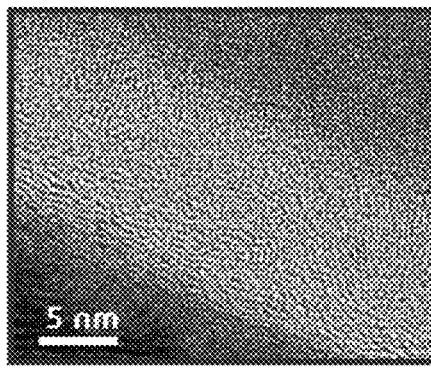

FIG. 7A shows a scanning electron microscope (SEM) photograph of a cross-section of a separator according to an embodiment of the present disclosure. FIG. 7B is an enlarged view of area A of FIG. 7A.

Figure 8A:
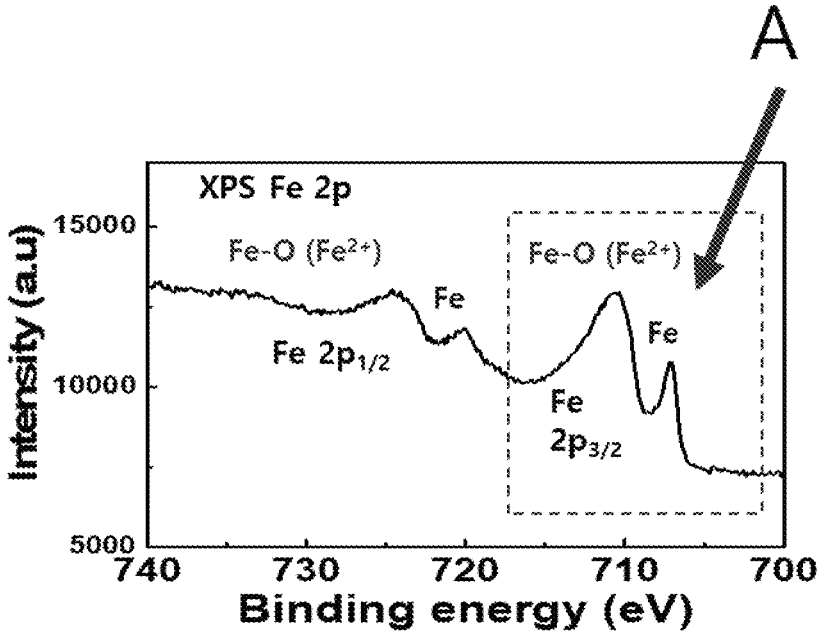
FIGS. 8A and 8B are XPS analysis results showing Fe, Fe—O bonding peaks of the Fe spectrum in the separator according to the present disclosure.
Figure 8B:
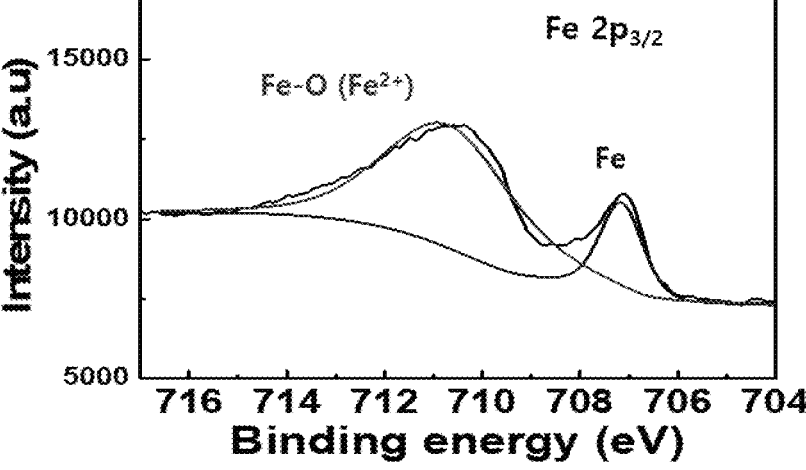

FIG. 8A shows an XPS analysis result showing Fe, Fe—O bonding peaks of the Fe spectrum in the separator according to the present disclosure. FIG. 8B shows an enlarged view of area A of FIG. 8A.

As shown in the results of FIGS. 8A and 8B, the value of $A_{Fe—O}/A_{Fe—O}+A_{Fe}$, which was represented by the ratio of the oxide film, existed within a range of 0.1 to 0.2.

Particularly, the metal oxide film had a ratio of a peak area satisfying Formula 1 to be 0.1 to 0.2 in the range of 704 to 713 eV during X-ray photoelectron spectroscopy.

$$A_{Fe—O}/(A_{Fe—O}+A_{Fe})$$ [Formula 1]

In Formula 1, $A_{Fe—O}$ is the area of the XPS peak representing the Fe—O binding energy, and Are is the area of the XPS peak representing the Fe binding energy.

Subsequently, the contact resistance and corrosion current density according to the ratio of the metal oxide to the optimized carbon coating layer was checked.

Figure 9A:
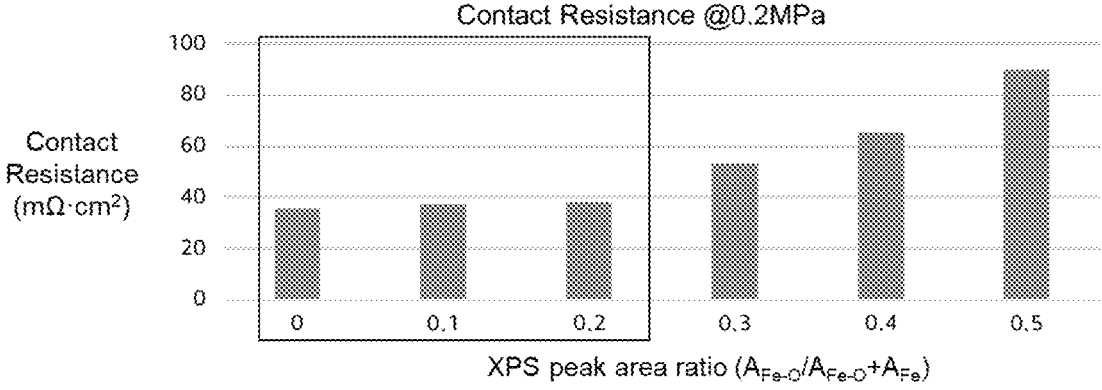
FIGS. 9A and 9B are measurement results of the contact resistance and corrosion current density according to a metal oxide film ratio in the separator.
Figure 9B:
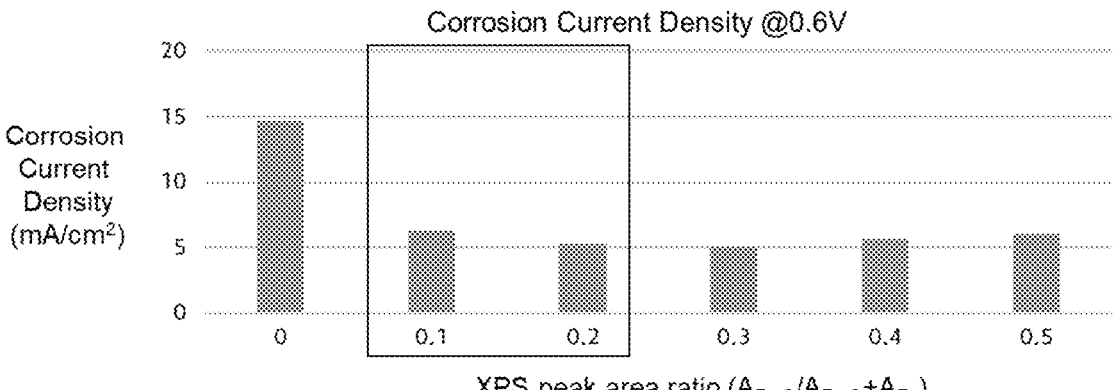

FIG. 9A shows the contact resistance according to a ratio of a metal oxide film in the separator. FIG. 9B shows the corrosion current density according to the metal oxide film ratio in the separator.

As shown by the results of FIGS. 9A and 9B, in the separator specimen, the contact resistance was about 40 $m\Omega cm^2@0.2$ MPa or less, and the corrosion current was measured to be 10 $\mu A/cm^2@0.6V$ or less. Therefore, by appropriately controlling the ratio of the metal oxide film in the carbon coating layer, the low contact resistance and low corrosion potential characteristics of the separator can be obtained at the same time. Particularly, the metal oxide film in the separator preferably included 5% to 10% of the carbon coating layer.

According to various exemplary embodiments of the present disclosure, the separator may have a specific carbon coating layer structure and a specific metal oxide ratio and thus have excellent corrosion resistance and conductivity, thereby being usefully used in a fuel cell.

Although the exemplary embodiment of the present disclosure has been described above, it will be understood by those skilled in the art that the present disclosure may be implemented in other specific forms without changing the technical spirit or essential features thereof. Therefore, it should be understood that the embodiments described above are illustrative in all respects and not restrictive.

What is claimed is:

1. A separator for a fuel cell comprising:
a metal base material; and
a carbon coating layer disposed on a surface of the metal base material,
wherein the carbon coating layer comprises a carbon domain having a size in the range of about 15 to 30 nm;
wherein the separator further comprises a metal oxide film interposed between the metal base material and the carbon coating layer; and
wherein the metal oxide film has a ratio of peak areas at 704 eV to 713 eV of about 0.1 to 0.2 in X-ray photoelectron spectroscopy (XPS) analysis, the ratio of peak areas represented by the Formula 1:

$$A_{Fe—O}/(A_{Fe—O}+A_{Fe})$$ [Formula 1]

where $A_{Fe—O}$ is a peak area representing an Fe—O binding energy level in the XPS, and $A_{Fe}$ is a peak area representing a Fe binding energy level in the XPS.

2. The separator of claim 1, wherein the carbon coating layer has a thickness of about 50 nm or less.

3. The separator of claim 1, wherein the carbon coating layer has a thickness of about 30 nm or less.

4. The separator of claim 1, wherein the thickness of the metal oxide film is in the range of about 5% to 10% of the thickness of the carbon coating layer.

5. A fuel cell comprising the separator of claim 1.

6. A vehicle comprising the fuel cell of claim 5.

* * * * *